(12) United States Patent
Yamaji

(10) Patent No.: US 8,184,170 B2
(45) Date of Patent: May 22, 2012

(54) IMAGING APPARATUS, INFORMATION PROCESSING APPARATUS AND METHOD, AND COMPUTER PROGRAM THEREFOR

(75) Inventor: Hidenori Yamaji, Tokyo (JP)

(73) Assignee: Sony Corporation, Tokyo (JP)

( * ) Notice: Subject to any disclaimer, the term of this patent is extended or adjusted under 35 U.S.C. 154(b) by 1059 days.

(21) Appl. No.: 12/110,764

(22) Filed: Apr. 28, 2008

(65) Prior Publication Data

US 2011/0254978 A1 Oct. 20, 2011

(30) Foreign Application Priority Data

Jun. 7, 2007 (JP) ................................. 2007-151713

(51) Int. Cl.
*H04N 5/232* (2006.01)
(52) U.S. Cl. ............................... 348/211.99; 348/211.2
(58) Field of Classification Search .. 348/211.99–211.2; 455/11.1–12.1, 13.1, 557, 556.1
See application file for complete search history.

(56) References Cited

U.S. PATENT DOCUMENTS

| 2007/0027595 | A1* | 2/2007 | Nou | 701/36 |
| 2010/0097269 | A1* | 4/2010 | Loidl et al. | 342/378 |

FOREIGN PATENT DOCUMENTS

| JP | 2002-107443 | 4/2002 |
| JP | 2004-125490 | 4/2004 |
| JP | 2004-194174 | 7/2004 |
| JP | 2005-277619 | 10/2005 |
| JP | 2005-295329 | 10/2005 |

* cited by examiner

*Primary Examiner* — Tuan Ho
(74) *Attorney, Agent, or Firm* — Oblon, Spivak, McClelland, Maier & Neustadt, L.L.P.

(57) ABSTRACT

An imaging apparatus includes an imaging unit that captures an image; a recording unit that records the image on a recording medium; a first position estimating unit that estimates a position of the imaging apparatus using a first position estimation technique to generate first position information, and calculates a first evaluation value serving as accuracy evaluation information of the first position information; a second position estimating unit that estimates the position of the imaging apparatus using a second position estimation technique different from the first position estimation technique to generate second position information, and calculates a second evaluation value serving as accuracy evaluation information of the second position information; a position-information obtaining unit that select, from the first and second position information, position information whose evaluation value is higher than the other; and an application executing unit that performs data processing using the selected position information.

20 Claims, 9 Drawing Sheets

FIG. 4

| | MEASUREMENT STATUS | EVALUATION VALUE (0-100) |
|---|---|---|
| (a) | TWO-DIMENSIONAL | 60 |
| (b) | THREE-DIMENSIONAL | 90 |
| (c) | INCAPABLE OF MEASUREMENT | 0 |

FIG. 5

| | OBTAINING OF POSITION INFORMATION FROM DATABASE (SUCCESSFUL OR FAILED) | RECEPTION SIGNAL LEVEL (ELECTRIC FIELD INTENSITY) | EVALUATION VALUE (0-100) |
|---|---|---|---|
| (a) | SUCCESSFUL | HIGH (THRESHOLD TH1 OR GREATER) | 100 |
| (b) | SUCCESSFUL | INTERMEDIATE (TH2 < TH1) | 70 |
| (c) | SUCCESSFUL | LOW (THRESHOLD TH2 OR LESS) | 50 |
| (d) | FAILED | — | 0 |

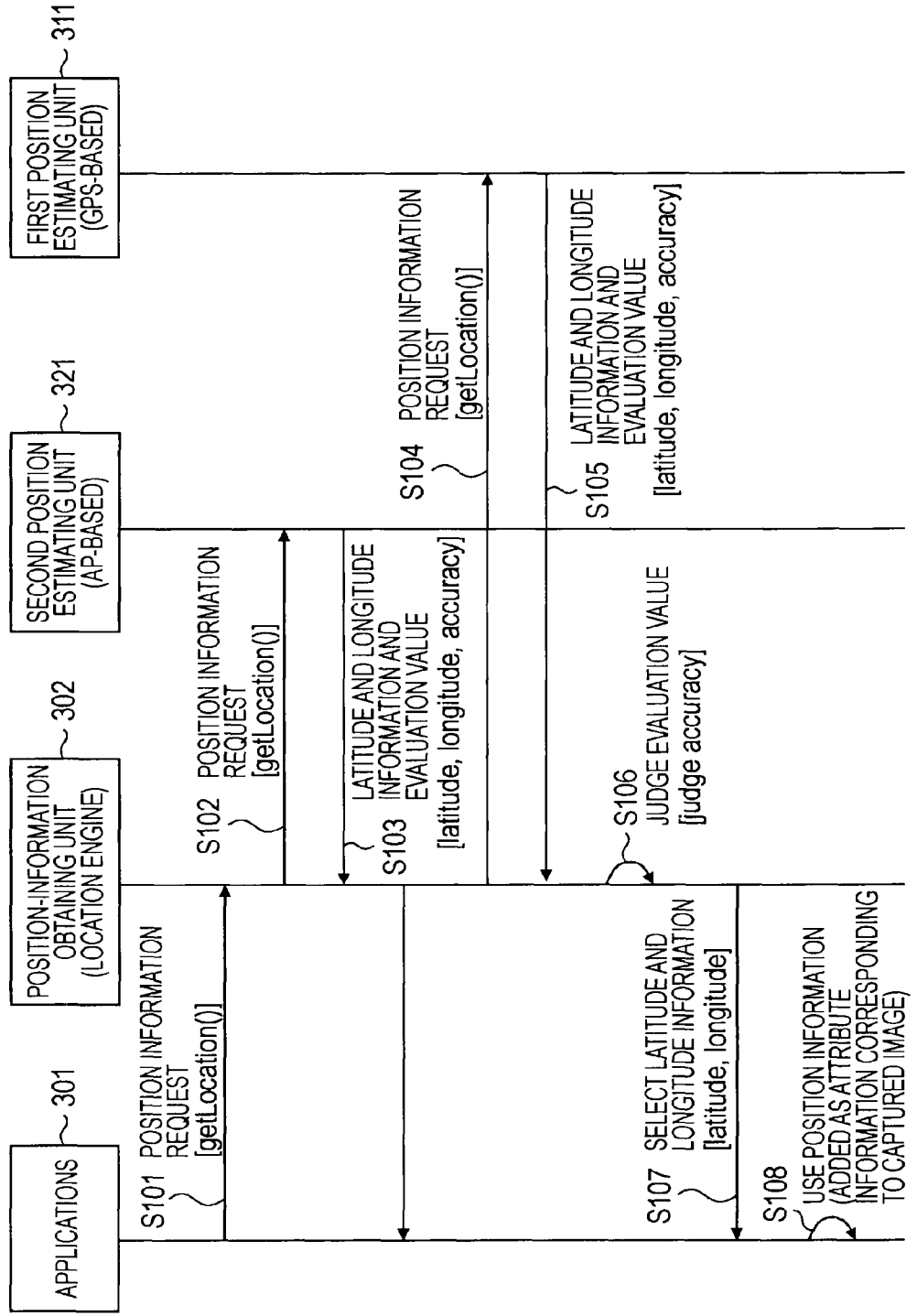

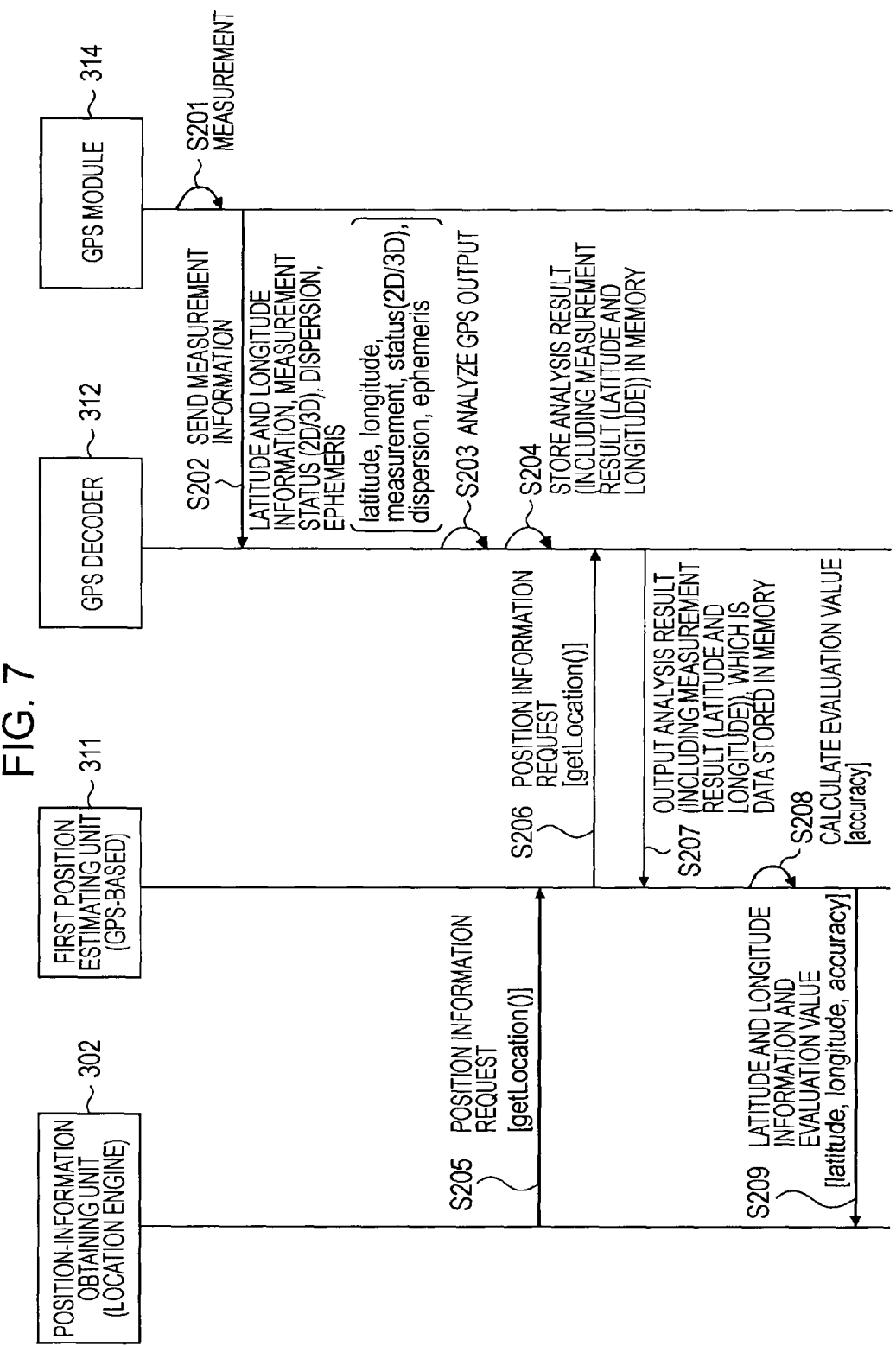

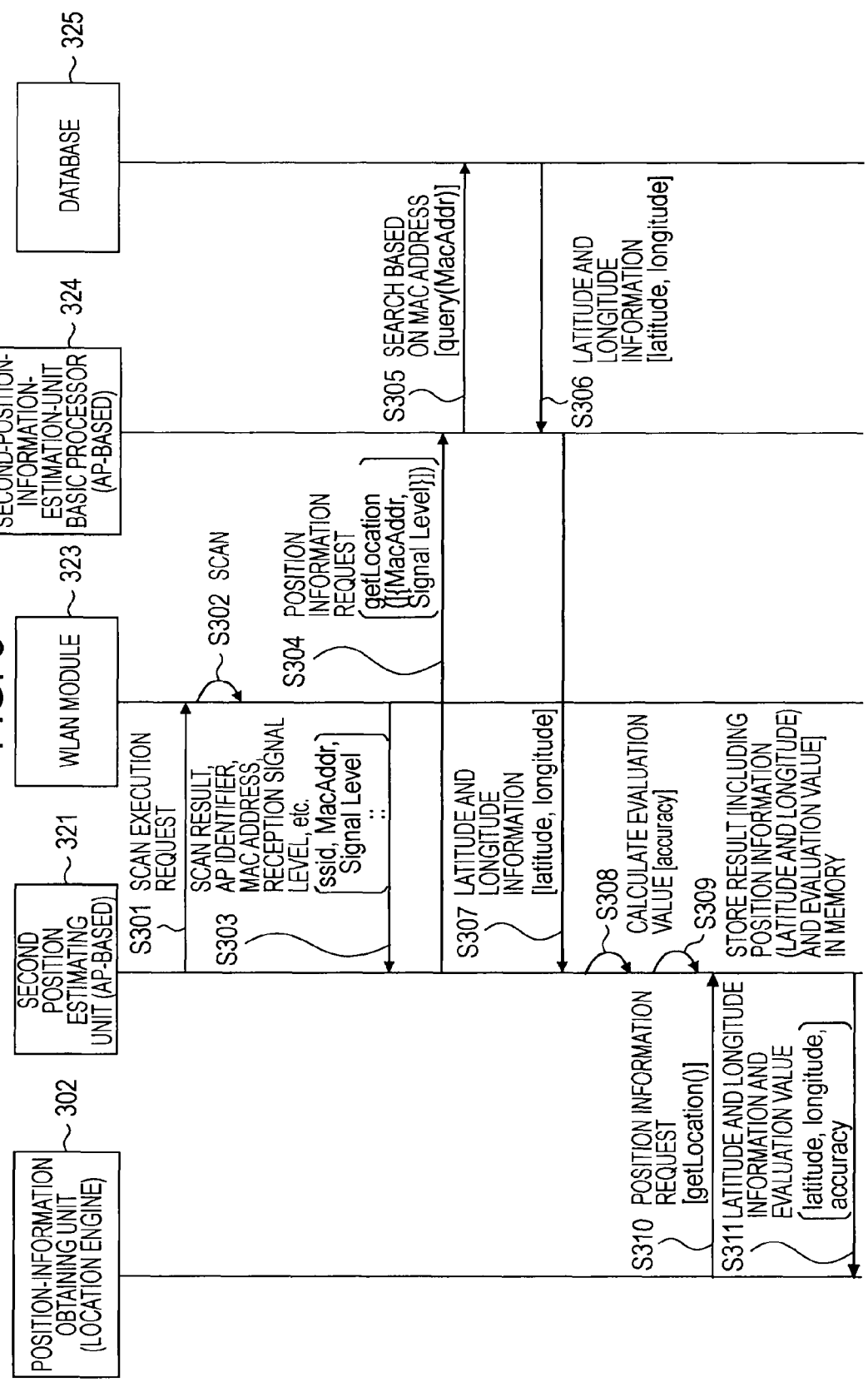

IMAGING APPARATUS, INFORMATION PROCESSING APPARATUS AND METHOD, AND COMPUTER PROGRAM THEREFOR

CROSS REFERENCES TO RELATED APPLICATIONS

The present invention contains subject matter related to Japanese Patent Application JP 2007-151713 filed in the Japanese Patent Office on Jun. 7, 2007, the entire contents of which are incorporated herein by reference.

BACKGROUND OF THE INVENTION

1. Field of the Invention

The present invention relates to imaging apparatuses, information processing apparatuses and methods, and computer programs therefor. More particularly, the present invention relates to an imaging apparatus, such as a digital camera, including position estimating units employing different techniques, in which items of position information individually obtained by the position estimating units are evaluated, and, position information determined to be more accurate is selectively used, an information processing apparatus and method, and a computer program therefor.

The present invention further relates to an imaging apparatus including, as position estimating units using different techniques, for example, a position estimating unit based on the Global Positioning System (GPS) and a position estimating unit based on detection information of access points (APs) serving as wireless communication base stations, in which position estimation results individually obtained by the position estimating units are evaluated, and position information is used in a manner that, for example, highly evaluated result data is used as attribute data of captured image data, an information processing apparatus and method, and a computer program therefor.

2. Description of the Related Art

Nowadays, imaging apparatuses such as digital cameras have become highly sophisticated. For example, some imaging apparatuses have the GPS function to obtain position information using GPS and record the obtained position information as attribute information of captured image data.

In order to obtain position information using GPS, an imaging apparatus is necessary to be able to receive radio waves from satellites. When beneath the ground, for example, the imaging apparatus is incapable of receiving radio waves from satellites and hence incapable of obtaining position information. In order to obtain position information using GPS, the imaging apparatus is necessary to perform a satellite acquisition process as an initial process, which takes time. That is, when a turned-off camera is switched on, the camera is incapable of immediately obtaining position information using GPS.

In order to reduce a wait time before position information is obtained, one method is available in which a GPS module of a camera is maintained in an operating state, and navigation messages from satellites are continuously received using the GPS module. The received navigation messages are stored in a storage unit, and satellite acquisition is performed using the stored navigation messages. The effective period of almanac data contained in the navigation messages is set to three months, and the effective period of ephemeris data contained in the navigation messages is set to two hours. Navigation messages stored in the storage unit are necessary to be updated one after another. Thus, a continuous message reception process is necessary to be performed.

A structure that can continuously receive navigation messages can update navigation messages recorded in a storage unit in a steady manner. Quick satellite acquisition using navigation messages (almanac data and ephemeris data) within the effective period can thus be performed. However, when no data within the effective period is recorded, efficient satellite acquisition using the data is difficult to be performed. Thus, a satellite acquisition process involving a relatively long processing time is necessary to be performed. As a result, the time from activation of the GPS module to the obtaining of position information becomes very long, and hence, position information is difficult to be obtained in a timely manner.

When a camera with a GPS module performs a process of adding position information obtained using the GPS module as attribute information of captured image data, it is necessary to obtain position information at the time an image is captured by a user. However, as has been described above, in an environment where position information is difficult to be obtained from satellites using GPS or when position information is difficult to be immediately obtained from satellites using GPS, accurate position information corresponding to captured image data is difficult to be obtained.

One of position estimation methods using techniques other than those using GPS is described in Japanese Unexamined Patent Application Publication No. 2002-107443. This method concerns a wireless communication system in which a mobile device estimates its position by measuring the intensity of radio waves received from a base station whose position information has been registered in advance. In such a configuration where the position is measured using the base station, the mobile device is incapable of measuring the position when the mobile device is in an area where the mobile device is incapable of communicating with the base station whose position information has been registered.

SUMMARY OF THE INVENTION

It is desirable to provide an imaging apparatus, such as a digital camera, including different position estimating units, in which position estimation results individually obtained by the position estimating units are evaluated, and highly evaluated result data is selectively obtained and used as, for example, attribute data of captured image data, an information processing apparatus and method, and a computer program therefor.

It is desirable to provide an imaging apparatus with, as different position estimating units, for example, a position estimating unit based on GPS and a position estimating unit based on detection information of APs serving as wireless communication base stations, in which position estimation results individually obtained by the position estimating units are evaluated, and position information is selected and used in a manner that, for example, highly evaluated result data is used as attribute data of captured image data, an information processing apparatus and method, and a computer program therefor.

According to a first embodiment of the present invention, there is provided an imaging apparatus that captures an image. The imaging apparatus includes the following elements: an imaging unit configured to capture an image; a recording unit configured to perform a process of recording the captured image on a recording medium; a first position estimating unit configured to estimate a position of the imaging apparatus using a first position estimation technique to generate first position information, and to calculate a first evaluation value serving as accuracy evaluation information of the first position information; a second position estimating unit configured to estimate the position of the imaging apparatus using a second position estimation technique to generate second position information, the second position estimation technique being different from the first position estimation technique, and to calculate a second evaluation value serving as accuracy evaluation information of the second position information; a position-information obtaining unit configured to select, from the first position information and the second position information, position information whose evaluation value is higher than the other; and an application executing unit configured to perform data processing using the position information selected by the position-information obtaining unit.

The first position estimating unit may be configured to generate the first position information by performing a position estimation process using GPS. The second position estimating unit may be configured to generate the second position information by performing a position estimation process using a technique that is different from the position estimation process using GPS.

The first position estimating unit may be configured to generate the first position information by performing a position estimation process using GPS. The second position estimating unit may be configured to generate the second position information by searching for a base station of wireless communication, receiving base-station identification information from the detected base station, and searching a database in which base-station identification information is associated with position information.

The first position estimating unit may be configured to generate the first position information by performing a position estimation process using GPS and to calculate the first evaluation value on the basis of measurement status information obtained by analyzing data received from a satellite. The second position estimating unit may be configured to generate the second position information by searching for a base station of wireless communication, receiving base-station identification information from the detected base station, and searching a database in which base-station identification information is associated with position information, and to calculate the second evaluation value on the basis of a reception signal level of a reception signal received from the base station at the time the base station is detected, the reception signal level corresponding to an electric field intensity.

The first position estimating unit may be configured to set a low evaluation value in a case where the measurement status information is two-dimensional and a high evaluation value in a case where the measurement status information is three-dimensional.

The second position estimating unit may be configured to compare the reception signal level with a predetermined threshold and to set a high evaluation value in a case where the reception signal level is greater than or equal to the threshold and a low evaluation value in a case where the reception signal level is less than the threshold.

The application executing unit may be configured to perform a process of recording the position information selected by the position-information obtaining unit as position information in a recording file of the captured image.

The application executing unit may be configured to perform a process of using the position information selected by the position-information obtaining unit as current position information representing a current position on a map displayed on a display unit.

According to a second embodiment of the present invention, there is provided an information processing apparatus including the following elements: a first position estimating unit configured to estimate a position of the information processing apparatus using a first position estimation technique to generate first position information, and to calculate a first evaluation value serving as accuracy evaluation information of the first position information; a second position estimating unit configured to estimate the position of the information processing apparatus using a second position estimation technique to generate second position information, the second position estimation technique being different from the first position estimation technique, and to calculate a second evaluation value serving as accuracy evaluation information of the second position information; a position-information obtaining unit configured to select, from the first position information and the second position information, position information whose evaluation value is higher than the other; and an application executing unit configured to perform data processing using the position information selected by the position-information obtaining unit.

The first position estimating unit may be configured to generate the first position information by performing a position estimation process using GPS. The second position estimating unit may be configured to generate the second position information by performing a position estimation process using a technique that is different from the position estimation process using GPS.

The first position estimating unit may be configured to generate the first position information by performing a position estimation process using GPS. The second position estimating unit may be configured to generate the second position information by searching for a base station of wireless communication, receiving base-station identification information from the detected base station, and searching a database in which base-station identification information is associated with position information.

The first position estimating unit may be configured to generate the first position information by performing a position estimation process using GPS and to calculate the first evaluation value on the basis of measurement status information obtained by analyzing data received from a satellite. The second position estimating unit may be configured to generate the second position information by searching for a base station of wireless communication, receiving base-station identification information from the detected base station, and searching a database in which base-station identification information is associated with position information, and to calculate the second evaluation value on the basis of a reception signal level of a reception signal received from the base station at the time the base station is detected, the reception signal level corresponding to an electric field intensity.

According to a third embodiment of the present invention, there is provided an information processing method performed by an information processing apparatus. The method includes the steps of, with a first position estimating unit, estimating a position of the information processing apparatus using a first position estimation technique to generate first position information, and calculating a first evaluation value serving as accuracy evaluation information of the first position information; with a second position estimating unit, estimating the position of the information processing apparatus using a second position estimation technique to generate second position information, the second position estimation technique being different from the first position estimation technique, and calculating a second evaluation value serving as accuracy evaluation information of the second position information; with a position-information obtaining unit, selecting, from the first position information and the second position information, position information whose evaluation value is higher than the other; and with an application executing unit, performing data processing using the selected position information.

The first position information may be generated by performing a position estimation process using GPS. The second position information may be generated by performing a position estimation process using a technique that is different from the position estimation process using GPS.

The first position information may be generated by performing a position estimation process using GPS. The second position information may be generated by searching for a base station of wireless communication, receiving base-station identification information from the detected base station, and searching a database in which base-station identification information is associated with position information.

The first position information may be generated by performing a position estimation process using GPS, and the first evaluation value may be calculated on the basis of measurement status information obtained by analyzing data received from a satellite. The second position information may be generated by searching for a base station of wireless communication, receiving base-station identification information from the detected base station, and searching a database in which base-station identification information is associated with position information, and the second evaluation value may be calculated on the basis of a reception signal level of a reception signal received from the base station at the time the base station is detected, the reception signal level corresponding to an electric field intensity.

When the first evaluation value is calculated, a low evaluation value may be set in a case where the measurement status information is two-dimensional and a high evaluation value may be set in a case where the measurement status information is three-dimensional.

When the second evaluation value is calculated, the reception signal level may be compared with a predetermined threshold, and a high evaluation value may be set in a case where the reception signal level is greater than or equal to the threshold and a low evaluation value may be set in a case where the reception signal level is less than the threshold.

When the data processing is performed using the selected position information, a process of recording the selected position information as position information in a recording file of the captured image may be performed.

When the data processing is performed using the selected position information, a process of using the selected position information as current position information representing a current position on a map displayed on a display unit may be performed.

According to a fourth embodiment of the present invention, there is provided a computer program for causing an information processing apparatus to perform information processing. The information processing includes the steps of causing a first position estimating unit to estimate a position of the information processing apparatus using a first position estimation technique to generate first position information, and to calculate a first evaluation value serving as accuracy evaluation information of the first position information; causing a second position estimating unit to estimate the position of the information processing apparatus using a second position estimation technique to generate second position information, the second position estimation technique being different from the first position estimation technique, and to calculate a second evaluation value serving as accuracy evaluation information of the second position information; causing a position-information obtaining unit to select, from the first position information and the second position information, position information whose evaluation value is higher than the other; and causing an application executing unit to perform data processing using the selected position information.

The computer program according to the embodiment of the present invention is a computer program provided in a computer-readable format, using a storage medium or a communication medium, to a general-purpose computer system that can execute various program codes. By providing such a program in a computer-readable format, a process associated with the program can be executed on the computer system.

Further objects, features, and advantages of the embodiments of the present invention will become apparent from detailed description based on the later-described embodiments of the present invention and the appended drawings. The term "system" in this specification is a logical set of a plurality of apparatuses and is not limited to the structure in which these apparatuses are accommodated in a single housing.

According to the embodiments of the present invention, first position information is generated using, for example, GPS. Second position information is generated by searching for a base station of wireless communication, receiving base-station identification information from the detected base station, and searching a database in which base-station identification information is associated with position information. Further, evaluation values serving as accuracy evaluation information of the first position information and the second position information are generated. Position information whose evaluation value is higher than the other is selected and used. According to this structure, for example, the second position information can be used in an area where GPS is difficult to be used, such as when the imaging apparatus is beneath the ground. Further, position information determined to be more accurate can be selectively used. For example, position information to be set as attribute information in the imaging apparatus can become more accurate data.

BRIEF DESCRIPTION OF THE DRAWINGS

FIG. 4 is a table describing an exemplary process of evaluating position information using the imaging apparatus according to the embodiment of the present invention;

FIG. 5 is a table describing an exemplary process of evaluating position information using the imaging apparatus according to the embodiment of the present invention;

FIG. 6 is a diagram of a processing sequence of obtaining, evaluating, and using position information using the imaging apparatus according to the embodiment of the present invention;

FIG. 7 is a diagram of a processing sequence of obtaining, evaluating, and using position information using the imaging apparatus according to the embodiment of the present invention;

FIG. 8 is a diagram of a processing sequence of obtaining, evaluating, and using position information using the imaging apparatus according to the embodiment of the present invention;

DESCRIPTION OF THE PREFERRED EMBODIMENTS

An imaging apparatus, an information processing apparatus and method, and a computer program therefor according to embodiments of the present invention will now herein be described in detail below with reference to the drawings.

Figure 1:
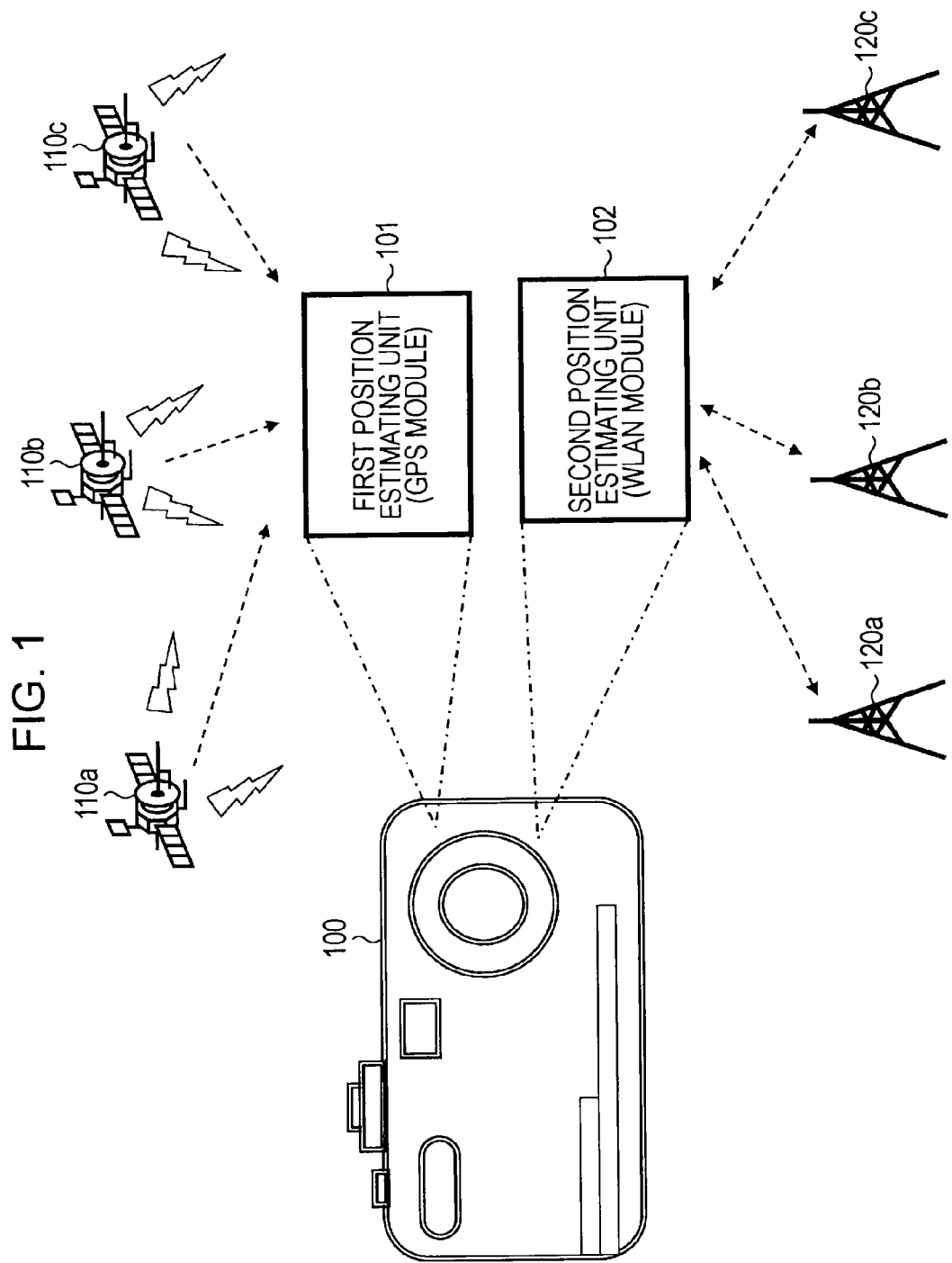
FIG. 1 is a schematic diagram of the structure of and a process performed by an imaging apparatus according to an embodiment of the present invention.

Referring now to FIG. 1, a process performed by an imaging apparatus serving as an example of an image processing apparatus according to an embodiment of the present invention will now be schematically described. An imaging apparatus 100 includes a plurality of position estimating units including a first position estimating unit 101 and a second position estimating unit 102 shown in FIG. 1.

These position estimating units individually perform position estimation processes using different methods. In the example shown in FIG. 1, the first position estimating unit 101 is a GPS module. The first position estimating unit 101 receives radio waves from satellites 110a to 110c and estimates the position of the imaging apparatus 100. The second position estimating unit 102 is a wireless local area network (WLAN) module. The second position estimating unit 102 performs a position estimation process based on detection information of APs 120a to 120c serving as base stations of WLAN communication, which is obtained by scanning the APs 120a to 120c. This process is described in detail later.

In the present embodiment, as has been described above, the case where one of the position estimating units included in the imaging apparatus estimates the position of the imaging apparatus using GPS, and the other position estimating unit performs a position estimation process based on detection information of APs in WLAN is described below. However, this is only one example. The imaging apparatus 100 is not limited to this combination of GPS and WLAN, and the imaging apparatus 100 can employ a combination of other position estimation techniques. Moreover, the imaging apparatus 100 may include position estimating units not only using two different techniques, but also using three or more different techniques.

The imaging apparatus 100 of the embodiment of the present invention evaluates items of position estimation information obtained from the position estimating units 101 and 102 and selectively uses position estimation information determined to be more accurate. For example, the imaging apparatus 100 adds the selected position information as attribute information to an image captured using the imaging apparatus 100 and records the attribute information together with the captured image in a medium.

Figure 2:
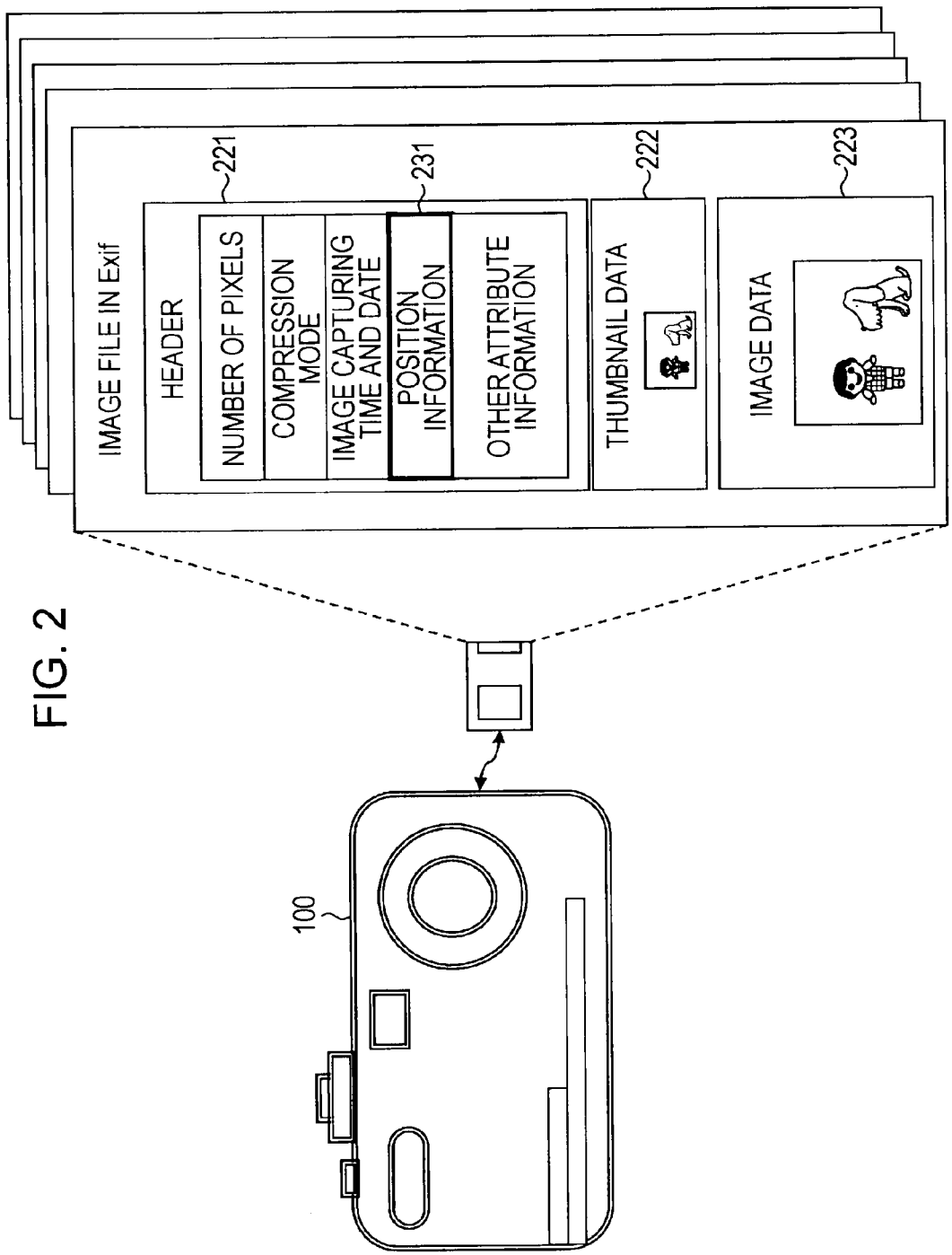
FIG. 2 illustrates an image file (Exif) recorded by the imaging apparatus according to the embodiment of the present invention.

FIG. 2 illustrates an exemplary data structure of a file recorded in a recording medium on the basis of an image captured using the imaging apparatus 100. The image captured using the imaging apparatus 100 is recorded as, for example, a file in the Exif format with the data structure shown in FIG. 2. One file in the Exif format is set to each item of captured image data. As shown in FIG. 2, a file in the Exif format includes a header 221, thumbnail data 222, and image data 223.

The thumbnail data 222 is an area for recording size-reduced image data. A list of images can be displayed using items of thumbnail data 223. The image data 223 is an area for recording actually captured image data.

The header 221 is an area for recording attribute information of an image. As shown in FIG. 2, the header 221 includes the number of pixels, compression mode, image capturing time and date, and further, in this example, position information 231. The position information 231 is selected position information determined to be more accurate by evaluating items of position estimation information obtained from the position estimating units 101 and 102 shown in FIG. 1.

In the case where the imaging apparatus 100 has, for example, a map display application, the imaging apparatus 100 displays a map on a display unit included in the imaging apparatus 100 in the following manner. On the basis of position estimation information with a high evaluation value, which is selected from items of position estimation information obtained from the position estimating units 101 and 102, a map of the neighborhood of the selected position information is displayed, and the current position is displayed on the displayed map. The selected position information can be used in various manners depending on applications installed in the imaging apparatus 100 and can be used in various other manners.

Figure 3:
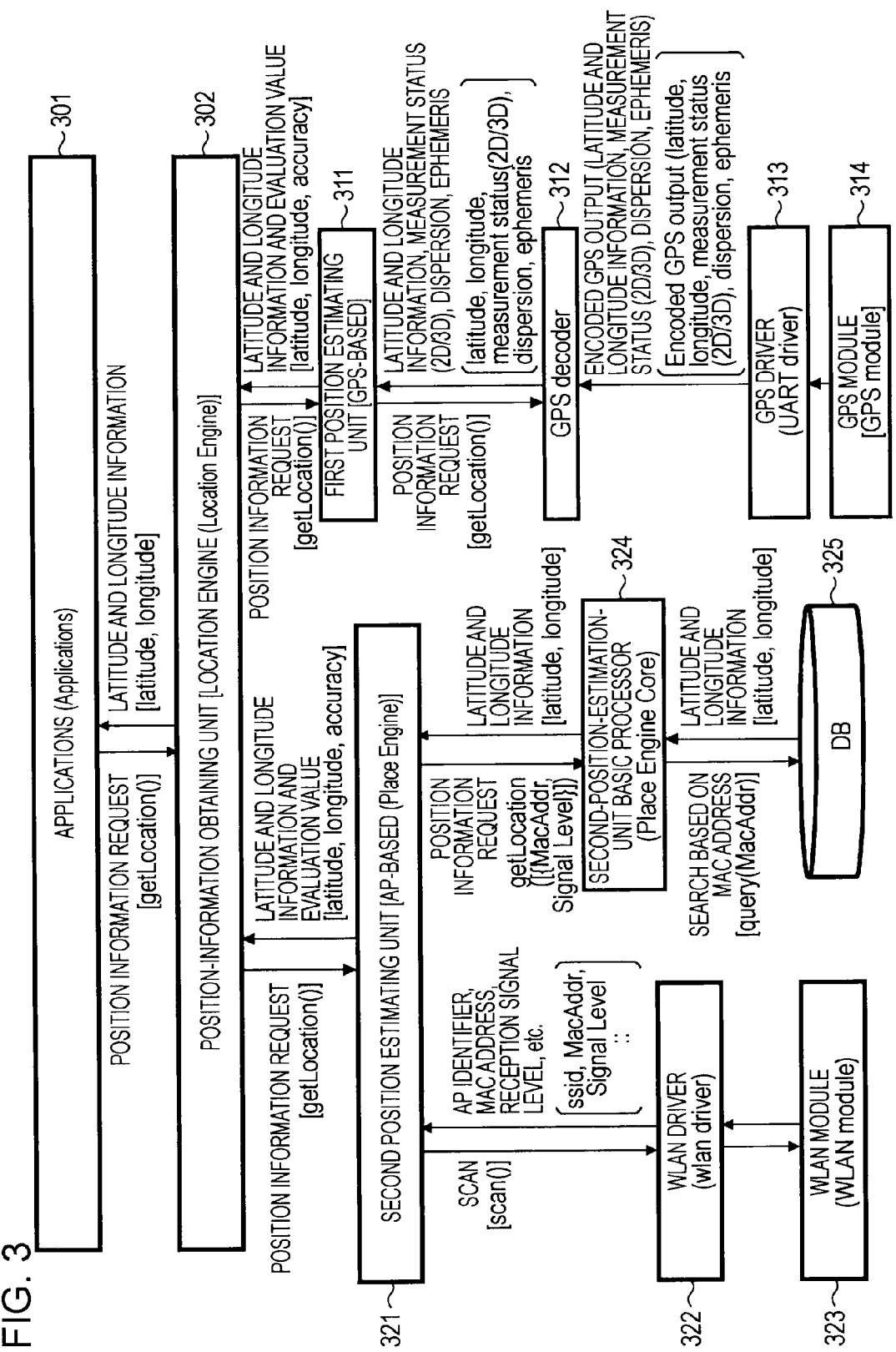
FIG. 3 illustrates the structure of the imaging apparatus according to the embodiment of the present invention and an exemplary process of obtaining, evaluating, and using position information.

Referring now to FIG. 3, a process performed using the imaging apparatus of the embodiment of the present invention will be described. FIG. 3 illustrates the overall process performed using the imaging apparatus of the embodiment of the present invention. Applications executing various processes including, for example, a process of recording a captured image in a medium and a process of displaying a map on a display of the imaging apparatus are installed in the imaging apparatus of the embodiment of the present invention. Applications 301 shown at the top of FIG. 3 are applications for executing these processes. The applications 301 are read and executed by a control unit (such as a central processing unit (CPU)) in accordance with a program stored in a storage unit of the imaging apparatus. An exemplary hardware structure of the imaging apparatus is described later.

In the structure shown in FIG. 3, the applications 301 at the top execute a process of receiving, from a position-information obtaining unit (location engine) 302, position information selected as more accurate position information from among items of position information obtained from a plurality of position estimating units included in the imaging apparatus and using the selected position information received. For example, the applications 301 execute a process of recording the position information as attribute information in a file (Exif) of a captured image, a process of displaying a map on a display, and the like, as has been described above.

The position-information obtaining unit (location engine) 302 receives, from two different position estimating units including a first position estimating unit (GPS-based) 311 and a second position estimating unit (AP-based) 321, items of position information (latitude and longitude information) individually obtained using respective techniques and evaluation values serving as indices of accuracy of the obtained position information.

From the two different position estimating units including the first position estimating unit (GPS-based) 311 and the second position estimating unit (AP-based) 321, the position-information obtaining unit (location engine) 302 receives the following two combinations of data:
(a) position information (latitude and longitude) obtained using GPS and its evaluation value; and
(b) position information obtained by scanning APs in WLAN and its accuracy value.

The position-information obtaining unit (location engine) 302 compares the evaluation values contained in these items of data, determines that position information (latitude and longitude) whose evaluation value is higher than the other is more accurate position information, selects the more accurate position information, and outputs the selected position information to the applications 301.

The first position estimating unit (GPS-based) 311 outputs position information (latitude and longitude) obtained using GPS and its evaluation value to the position-information obtaining unit (location engine) 302. A GPS module 314 receives data from satellites and sends the received data to a GPS decoder 312 via a GPS driver (UART driver) 313. On the basis of the data received from the GPS module 314, the GPS decoder 312 obtains, for example, latitude and longitude information serving as position information, measurement status information (two-dimensional/three-dimensional), dispersion, and ephemeris data. Whether the measurement status is two-dimensional or three-dimensional corresponds to accuracy of position information that can be analyzed on the basis of data received from satellites. When the measurement status is two-dimensional, the corresponding position information obtained is of low accuracy. When the measurement status is three-dimensional, the corresponding position information obtained is of high accuracy.

The first position estimating unit (GPS-based) 311 receives these items of data obtained by the GPS decoder 312, calculates an evaluation value corresponding to the position information (latitude and longitude) obtained using GPS, and outputs the position information (latitude and longitude) obtained using GPS, together with the calculated evaluation value, to the position-information obtaining unit (location engine) 302.

In contrast, the second position estimating unit (AP-based) 321 outputs position information (latitude and longitude) obtained by scanning APs in WLAN and its evaluation value to the position-information obtaining unit (location engine) 302.

A process of obtaining position information (latitude and longitude) by scanning APs is described in detail below. A WLAN module 323 included in the imaging apparatus executes a scanning process as a process of searching for APs in the neighborhood of the imaging apparatus. The scanning process is a process of searching for APs that are located in the neighborhood where communication is possible. With the scanning process, data including a service set identifier (SSID) corresponding to an identifier of each AP and a media access control (MAC) address of each AP is obtained from each of APs that are located in the neighborhood of the imaging apparatus and that can communicate with the imaging apparatus. SSID is bit information serving as the identifier unique to each AP.

From each AP, the WLAN module 323 receives SSID serving as identification information unique to the AP and the MAC address (electric field intensity), measures a reception signal level on the basis of a reception signal received from the AP, and outputs these items of information to the second position estimating unit (AP-based) 321 via a WLAN driver 322.

The second position estimating unit (AP-based) 321 outputs items of information obtained from the WLAN module 323, namely, the MAC address corresponding to each AP, which is obtained from each of APs located in the neighborhood of the imaging apparatus, and reception-signal-level (electric field intensity) information corresponding to each AP, to a second-position-estimation-unit basic processor (place engine core) 324.

On the basis of these items of information, the second-position-estimation-unit basic processor (place engine core) 324 searches a database 325 and obtains current position information (latitude and longitude) of the imaging apparatus.

The database 325 is a database in which data is registered so that latitude and longitude information can be obtained on the basis of identification information (MAC address) of each AP. For example, items of data including MAC address information of each AP and latitude and longitude information of each AP are registered in a corresponding manner in the database 325. Alternatively, items of data including one MAC address of an AP or a combination of MAC addresses of APs and position information obtained on the basis of the value of a reception signal level from the AP or a combination of the values of reception signal levels from the APs are registered in a corresponding manner in the database 325.

For example, when information obtained by the WLAN module 323 includes a MAC address corresponding to one AP and a reception signal level obtained from this particular AP, latitude and longitude information corresponding to this particular AP, which is associated with the MAC address of that AP and registered in the database 325, is determined as the current position of the imaging apparatus.

Alternatively, for example, when information obtained by the WLAN module 323 includes two MAC addresses of two APs and two reception signal levels obtained from the two APs, position information is obtained from the database 325 on the basis of a combination of the MAC addresses of the two APs and a combination of the reception signal levels obtained from the two APs. In the case where items of data are received from a plurality of APs in the scanning process, as has been described above, a more accurate current position can be obtained from the database 325.

The second-position-estimation-unit basic processor (place engine core) 324 outputs position information (latitude and longitude) obtained from the database 325 to the second position estimating unit (AP-based) 321.

The second position estimating unit (AP-based) 321 receives the position information (latitude and longitude) obtained by the second-position-estimation-unit basic processor (place engine core) 324 from the database 325. Further, the second position estimating unit (AP-based) 321 receives items of information obtained by the WLAN module 323, namely, the MAC address(es) corresponding to the AP(s) obtained from the AP(s) detected by the scanning process in the neighborhood of the imaging apparatus and the reception signal level (electric field intensity) information corresponding to the AP(s). On the basis of these items of information, the second position estimating unit (AP-based) 321 calculates an evaluation value of the position information (latitude and longitude) obtained by the second-position-estimation-unit basic processor (place engine core) 324 from the database 325 and outputs the position information (latitude and longitude) obtained by scanning the AP(s), together with the calculated evaluation value, to the position-information obtaining unit (location engine) 302.

The position-information obtaining unit (location engine) 302 receives, from two different position estimating units, namely, the first position estimating unit (GPS-based) 311 and the second position estimating unit (AP-based) 321, items of position information (latitude and longitude information) individually obtained using respective techniques and evaluation values serving as indices of accuracy of the obtained items of position information. That is, as has been described above, the position-information obtaining unit (location engine) 302 receives the following two combinations of data:
(a) position information (latitude and longitude) obtained using GPS and its evaluation value; and
(b) position information obtained by scanning APs in WLAN and its accuracy value.

The position-information obtaining unit (location engine) 302 compares the evaluation values contained in these items of data, determines that position information (latitude and longitude) whose evaluation value is higher than the other is more accurate position information, selects the more accurate position information, and outputs the selected position information to the applications 301.

The applications 301 receive the position information selected by the position-information obtaining unit (location engine) 302 and perform a process using the received position information, such as a process of recording the position information as attribute information in a file (Exif) of a captured image or a process of displaying a map on a display, as has been described above.

The imaging apparatus of the embodiment of the present invention performs different position estimation methods, calculates evaluation values corresponding to items of position information obtained using the different position estimation methods, compares the calculated evaluation values, determines that position information whose evaluation value is higher than the other is more accurate position information, and selects the more accurate position information as position information to be used in applications. With this process, for example, even when position information measured using GPS is of low reliability, position information obtained by searching a database on the basis of a MAC address(es) of an AP(s), which is obtained by scanning APs in WLAN, can be used.

In contrast, when position information obtained by searching a database on the basis of a MAC address(es) of an AP(s), which is obtained by scanning APs in WLAN, is of low reliability, position information obtained using GPS can be used in applications.

The first position estimating unit (GPS-based) 311 and the second position estimating unit (AP-based) 321 each calculate an evaluation value corresponding to position information obtained using a respective technique. Exemplary processes of calculating evaluation values are described with reference to FIGS. 4 and 5.

The following description concerns an example in which an evaluation value of position information obtained by the first position estimating unit (GPS-based) 311 using GPS is calculated.

As has been described, on the basis of data received by the GPS module 314, the GPS decoder 312 obtains, for example, latitude and longitude information serving as position information, measurement status information (two-dimensional/three-dimensional), dispersion, and ephemeris data. Among these items of data, the measurement status, which is two-dimensional or three-dimensional, corresponds to accuracy of position information that can be analyzed on the basis of the data received from satellites. That is, when the measurement status is two-dimensional, the corresponding position information obtained is of low accuracy. When the measurement status is three-dimensional, the corresponding position information obtained is of high accuracy. In this manner, items of position information of different accuracy levels are obtained.

The first position estimating unit (GPS-based) 311 determines an evaluation value on the basis of, for example, the measurement status.

FIG. 4 illustrates an example in which evaluation values of items of position information obtained by the first position estimating unit (GPS-based) 311 using GPS are set. As shown in FIG. 4, an evaluation value ranges from 0 to 100 and is set in the following manner:
(a) when the measurement status is three-dimensional, the evaluation value is set to 90;
(b) when the measurement status is two-dimensional, the evaluation value is set to 60; and
(c) when no measurement is performed, the evaluation value is set to 0.

In the foregoing example, 0 is the lowest evaluation value, and 100 is the highest evaluation value.

On the basis of the MAC address(es) obtained by scanning the APs in WLAN or on the basis of the MAC address(es) and signal level(s) (electric field intensity), the second position estimating unit (AP-based) 321 obtains position information (latitude and longitude) from the database 325 and calculates an evaluation value serving as a reliability level of the obtained position information.

FIG. 5 illustrates an example in which evaluation values of items of position information obtained by the second position estimating unit (AP-based) 321 by scanning the APs are set. As shown in FIG. 5, an evaluation value ranges from 0 to 100 and is set in the following manner:
(a) when position information is successfully obtained from the database and when at least one of the reception signal level(s) (electric field intensity) of reception data obtained from the AP(s) is high, that is, greater than or equal to a predetermined threshold (Th1), the evaluation value is set to 100;
(b) when position information is successfully obtained from the database and when the highest reception signal level (electric field intensity) of reception data obtained from the AP(s) is intermediate, that is, within the range of predetermined thresholds (Th1 and Th2), the evaluation value is set to 70;
(c) when position information is successfully obtained from the database and when the highest reception signal level (electric field intensity) of reception data obtained from the AP(s) is low, that is, less than or equal to the predetermined threshold (Th2), the evaluation value is set to 50; and
(d) when the obtaining of position information from the database is unsuccessful (failed), the evaluation value is set to 0.

In the foregoing example, 0 is the lowest evaluation value, and 100 is the highest evaluation value.

The foregoing examples of setting the evaluation value are only exemplary, and other evaluation criteria or evaluation algorithms can be employed.

The position-information obtaining unit (location engine) 302 receives, from two different position estimating units, namely, the first position estimating unit (GPS-based) 311 and the second position estimating unit (AP-based) 321, items of position information (latitude and longitude information) individually obtained using respective techniques and evaluation values calculated using the foregoing evaluation processes. The position-information obtaining unit (location engine) 302 compares the two evaluation values, determines that position information whose evaluation value is higher than the other is more accurate position information, selects the more accurate position information, and outputs the selected position information to the applications 301.

The overall sequence of the imaging apparatus according to the embodiment of the present invention is as has been described above with reference to FIG. 3. Referring now to FIGS. 6 to 8, the more detailed processing sequence of each of blocks is described as follows:

(1) the processing sequence performed by the applications 301, the position-information obtaining unit (location engine) 302, and the first and second position estimating units 311 and 321 (FIG. 6);
(2) the processing sequence performed by the position-information obtaining unit (location engine) 302, the first position estimation unit (GPS-based) 311, the GPS decoder 312, and the GPS module 314 (FIG. 7); and
(3) the processing sequence performed by the position-information obtaining unit 302, the second position estimation unit (AP-based) 321, the WLAN module 323, the second-position-estimation-unit basic processor (place engine core) 324, and the database 325 (FIG. 8).

Referring now to FIG. 6, the detailed sequence of a process performed by the applications 301, the position-information obtaining unit (location engine) 302, the first position estimating unit (GPS-based) 311, and the second position estimating unit (AP-based) 321 is described.

In step S101, the applications 301 send a request to the position-information obtaining unit (location engine) 302 to obtain position information. Upon receipt of the position-information obtaining request, in steps S102 and S104, the position-information obtaining unit (location engine) 302 sends a request to the first position estimating unit (GPS-based) 311 and the second position estimating unit (AP-based) 321 to obtain position information. In the sequence shown in FIG. 6, in step S102, a request is sent to the second position estimating unit (AP-based) 321 to obtain position information, and, in step S104, a request is sent to the first position estimating unit (GPS-based) 311 to obtain position information. However, these requests can be sent in parallel to each other.

In step S102, the second position estimating unit (AP-based) 321 receives the position-information obtaining request from the position-information obtaining unit (location engine) 302. As has been described above, the second position estimating unit (AP-based) 321 obtains position information (latitude and longitude) by searching the database 325 on the basis of the MAC address(es) of the AP(s) and the reception signal level(s) (electric field intensity) obtained from scanning information obtained by the WLAN module 323, and calculates an evaluation value of the obtained position information. In step S103, the second position estimating unit (AP-based) 321 outputs the position information and the evaluation value to the position-information obtaining unit (location engine) 302. The process performed by the second position estimating unit (AP-based) 321 as a process corresponding to steps S102 and S103 is described in detail later with reference to FIG. 8.

In step S104, the first position estimating unit (GPS-based) 311 receives the position-information obtaining request from the position-information obtaining unit (location engine) 302. As has been described above, the first position estimating unit (GPS-based) 311 obtains position information (latitude and longitude) by performing a measurement process using the GPS module 314 and calculates an evaluation value of the obtained position information. In step S105, the first position estimating unit (GPS-based) 311 outputs the position information and the evaluation value to the position-information obtaining unit (location engine) 302. The process performed by the first position estimating unit (GPS-based) 311 as a process corresponding to steps S104 and S105 is described in detail later with reference to FIG. 7.

The position-information obtaining unit (location engine) 302 receives, from two different position estimating units, namely, the first position estimating unit (GPS-based) 311 and the second position estimating unit (AP-based) 321, items of position information (latitude and longitude information) individually obtained using respective techniques and evaluation values thereof. In step S106, the position-information obtaining unit (location engine) 302 compares the two evaluation values, determines that position information whose evaluation value is higher than the other is more accurate position information, and selects the more accurate position information. In step S107, the position-information obtaining unit (location engine) 302 outputs the selected position information to the applications 301.

In step S108, the applications 301 use the position information received from the position-information obtaining unit (location engine) 302 for processes of applications. For example, as has been described above, the applications 301 perform a process of recording the position information as attribute information in a file (Exif) of a captured image or a process of displaying a map of the position corresponding to the obtained position information on a display.

Referring now to FIG. 7, the detailed sequence of a process performed by the position-information obtaining unit (location engine) 302, the first position estimating unit (GPS-based) 311, the GPS decoder 312, and the GPS module 314 is described. This process corresponds to a detailed process performed by the foregoing elements in order to perform steps S104 and S105 shown in FIG. 6. Step S205 shown in FIG. 7 corresponds to step S104 shown in FIG. 6, that is, a position-information obtaining request sent from the position-information obtaining unit (location engine) 302. Step S209 shown in FIG. 7 corresponds to step S105 shown in FIG. 6, that is, a process of outputting position information and its evaluation value from the first position estimating unit (GPS-based) 311 to the position-information obtaining unit (location engine) 302.

Steps S201 to S204 shown in FIG. 7 correspond to a process continuously performed in the case where the GPS module 314 is in an operating state. Alternatively, the process may be performed in response to an instruction given from the position-information obtaining unit (location engine) 302.

In step S201, the GPS module 314 receives radio waves from satellites and performs a measurement process. In step S202, the GPS module 314 outputs items of information obtained as measurement results to the GPS decoder 312. The items of information obtained as the measurement results include, for example, latitude and longitude information serving as position information, measurement status information (two-dimensional/three-dimensional), dispersion, and ephemeris data.

Upon receipt of these items of information from the GPS module 314, in step S203, the GPS decoder 312 analyzes the received items of information. The analysis includes an analysis of the latitude and longitude information, an analysis of the measurement status information (two-dimensional/three-dimensional), an analysis of the dispersion information, an analysis of the ephemeris data, and an analysis of other information. In step S204, the GPS decoder 312 stores the analysis results in a memory.

Steps S201 to S204 correspond to a process continuously performed in the case where, as has been described above, the GPS module 314 is in an operating state. With this continuous measurement process, information such as position information recorded in the memory is periodically updated, and data based on the latest measurement information is stored in the memory.

In step S205, the position-information obtaining unit (location engine) 302 sends a request to the first position estimating unit (GPS-based) 311 to obtain position information. In response to this, in step S206, the first position estimating unit (GPS-based) 311 outputs a request to the GPS decoder 312 to obtain position information.

Upon receipt of the position-information obtaining request from the first position estimating unit (GPS-based) 311, in step S207, the GPS decoder 312 outputs the analysis results stored in the memory, which serve as the latest data stored in the memory at that point, to the first position estimating unit (GPS-based) 311. The output items of information include, for example, the latest position information (latitude and longitude) obtained by the GPS module 314 and the measurement status (two-dimensional/three-dimensional).

Upon receipt of data such as the position information from the GPS decoder 312, in step S208, the first position estimating unit (GPS-based) 311 evaluates the position information. This evaluation process is performed on the basis of, for example, as has been described above with reference to FIG. 4, the measurement status. As shown in FIG. 4, an evaluation value ranges from 0 to 100 and is set in the following manner:
(a) when the measurement status is three-dimensional, the evaluation value is set to 90;
(b) when the measurement status is two-dimensional, the evaluation value is set to 60; and
(c) when no measurement is performed, the evaluation value is set to 0.

In step S209, the first position estimating unit (GPS-based) 311 outputs the position information (latitude and longitude) obtained by performing the measurement process using the GPS module 314 and the evaluation value calculated by the foregoing process to the position-information obtaining unit (location engine) 302.

Referring now to FIG. 8, the detailed sequence of a process performed by the position-information obtaining unit (location engine) 302, the second position estimating unit (AP-based) 321, the WLAN module 323, the second-position-estimation-unit basic processor (place engine core) 324, and the database 325 is described. This process corresponds to a detailed process performed by the foregoing elements in order to perform steps S102 and S103 shown in FIG. 6. Step S310 shown in FIG. 8 corresponds to step S102 shown in FIG. 6, that is, a position-information obtaining request sent from the position-information obtaining unit (location engine) 302. Step S311 shown in FIG. 8 corresponds to step S103 shown in FIG. 6, that is, a process of outputting position information and its evaluation value from the second position estimating unit (AP-based) 321 to the position-information obtaining unit (location engine) 302.

Steps S301 to S309 shown in FIG. 8 corresponds to a process that can be performed in the case where the WLAN module 323 is in an operating state. The process can be performed regardless of the presence of instructions given from the upper-level applications 301 or the position-information obtaining unit (location engine) 302. Alternatively, the process may be performed in response to an instruction given from the position-information obtaining unit (location engine) 302.

In step S301, the second position estimating unit (AP-based) 321 outputs a scan execution request to the WLAN module 323. In step S302, the WLAN module 323 executes a scanning process serving as a process of searching for APs that are located in the neighborhood of the imaging apparatus.

With the scanning process, the WLAN module 323 receives SSID serving as the identifier and the MAC address of each of the APs located in the neighborhood. Further, the WLAN module 323 measures a reception signal level (electric field intensity) on the basis of a reception signal obtained from each AP. In step S303, the WLAN module 323 outputs these items of information to the second position estimating unit (AP-based) 321.

In step S304, the second position estimating unit (AP-based) 321 outputs the information obtained from the WLAN module 323, that is, the MAC address according to each AP, which is obtained from each of the APs located in the neighborhood, and reception-signal-level (electric field intensity) information corresponding to each AP, to the second-position-estimation-unit basic processor (place engine core) 324.

In step S305, the second-position-estimation-unit basic processor (place engine core) 324 searches the database 325 on the basis of the MAC address(es) of the AP(s) detected by performing the scanning process or on the basis of the MAC address(es) and the reception signal level(s) (electric field intensity). In step S306, the second-position-estimation-unit basic processor (place engine core) 324 obtains latitude and longitude information corresponding to the AP(s), which is registered in the database 325, as the current position of the imaging apparatus.

In step S307, the second-position-estimation-unit basic processor (place engine core) 324 outputs the position information (latitude and longitude) obtained from the database 325 to the second position estimating unit (AP-based) 321.

In step S308, the second position estimating unit (AP-based) 321 calculates an evaluation value of the position information obtained by the second-position-estimation-unit basic processor (place engine core) 324 from the database 325.

The evaluation value is calculated on the basis of the information obtained by the WLAN module 323, that is, the MAC address(es) of the AP(s) obtained from the AP(s) detected by the scanning process in the neighborhood of the imaging apparatus and the reception signal level (electric field intensity) information corresponding to the AP(s). That is, as has been described above with reference to FIG. 5, an evaluation value ranges from 0 to 100 and is set in the following manner:
(a) when position information is successfully obtained from the database and when at least one of the reception signal level(s) (electric field intensity) of reception data obtained from the AP(s) is high, that is, greater than or equal to a predetermined threshold (Th1), the evaluation value is set to 100;
(b) when position information is successfully obtained from the database and when the highest reception signal level (electric field intensity) of reception data obtained from the AP(s) is intermediate, that is, within the range of predetermined thresholds (Th1 and Th2), the evaluation value is set to 70;
(c) when position information is successfully obtained from the database and when the highest reception signal level (electric field intensity) of reception data obtained from the AP(s) is low, that is, less than or equal to the predetermined threshold (Th2), the evaluation value is set to 50; and
(d) when the obtaining of position information from the database is unsuccessful (failed), the evaluation value is set to 0.

In step S309, the second position estimating unit (AP-based) 321 stores data including the measurement results and evaluation values in a memory. Steps S301 to S309 correspond to a process that can be performed in the case where the WLAN module 323 is in an operating state. With this process, information such as position information recorded in the memory can be periodically updated, and the latest position information and its evaluation value are stored in the memory on a constant basis.

When the position-information obtaining unit (location engine) 302 sends a position-information obtaining request to the second position estimating unit (AP-based) 321 in step S310, the second position estimating unit (AP-based) 321 outputs, in step S311, the obtained position information (latitude and longitude) and the evaluation value calculated by the foregoing process to the position-information obtaining unit (location engine) 302.

With the processes described with reference to FIGS. 7 and 8, the position-information obtaining unit (location engine) 302 receives, from two different position estimating units, namely, the first position estimating unit (GPS-based) 311 and the second position estimating unit (AP-based) 321, items of position information (latitude and longitude information) individually obtained using respective techniques and evaluation values thereof. The position-information obtaining unit (location engine) 302 compares the two evaluation values, determines that position information whose evaluation value is higher than the other is more accurate position information, selects the more accurate position information, and outputs the selected position information to the applications 301. The applications 301 use the position information received from the position-information obtaining unit (location engine) 302 in performing processes of applications. That is, for example, the applications 301 perform a process of recording the position information as attribute information in a file (Exif) of a captured image or a process of displaying a map of the position corresponding to the obtained position information on a display.

Figure 9:
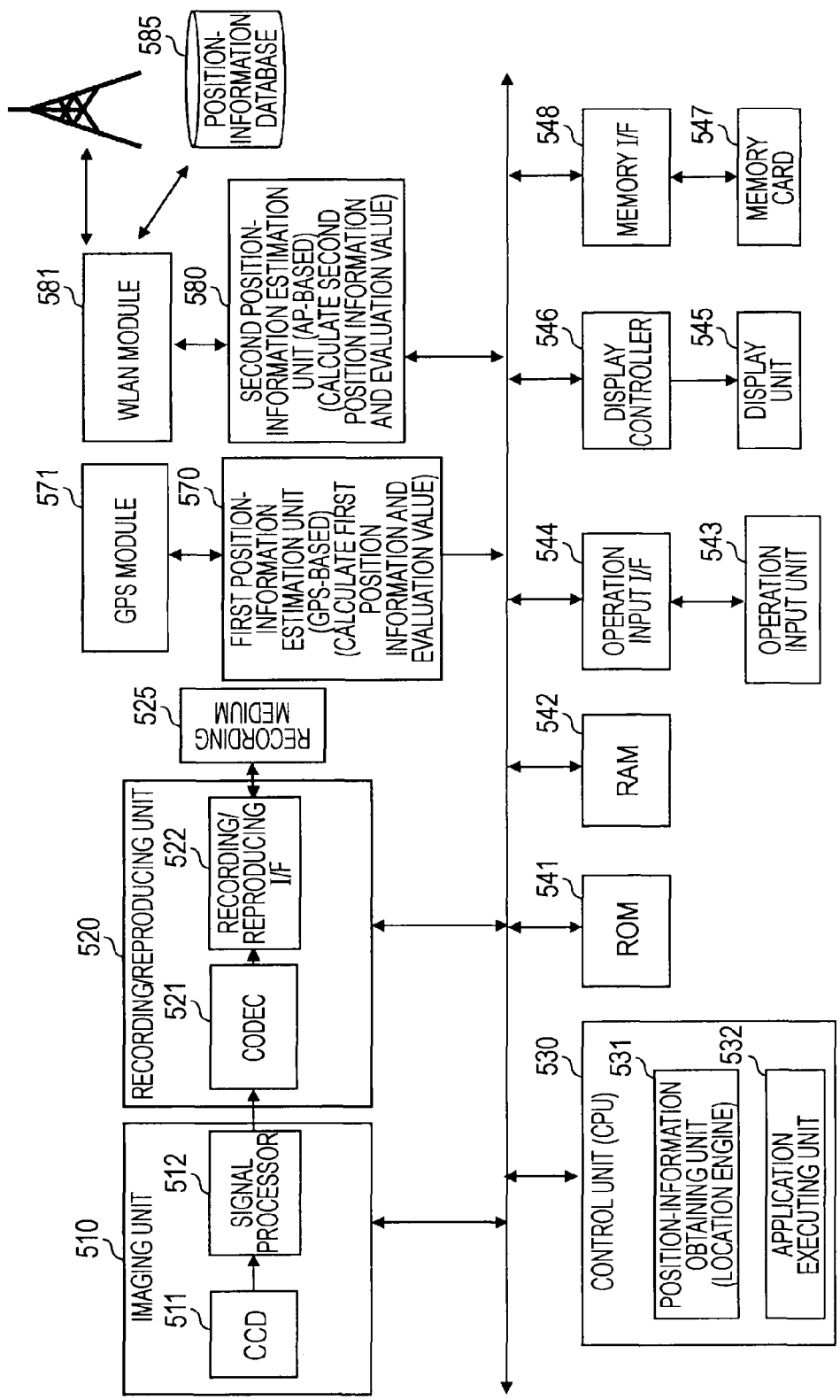
FIG. 9 is a block diagram of an exemplary structure of the imaging apparatus according to the embodiment of the present invention.

With reference to FIG. 9, an exemplary hardware structure of the imaging apparatus according to the embodiment of the present invention is described. FIG. 9 is a block diagram of an exemplary structure of the imaging apparatus according to the embodiment of the present invention. The imaging apparatus records captured image data obtained using an imaging unit 510 including a charge-coupled device (CCD) 511 and a signal processor 512 in a recording medium 525 via a recording/reproducing unit 520 including a codec 521 and a recording/reproducing interface (I/F) 522. A file of a captured image recorded in the recording medium 525 is a file in the Exif format, which has been described above with reference to FIG. 2. In this file, position information is recorded as attribute information.

Position-information obtaining processes using different methods are performed by a combination of a first position-information estimating unit 570 and a GPS module 571 and a combination of a second position-information estimating unit 580 and a WLAN module 581 shown in FIG. 9. More specifically, the combination of the first position-information estimating unit 570 and the GPS module 571 performs a GPS-based position-information obtaining process, and the combination of the second position-information estimating unit 580 and the WLAN module 581 performs an AP-based position-information obtaining process. That is, the latter combination of the second position-information estimating unit 580 and the WLAN module 581 performs a position-information obtaining process by searching a position-information database 585 on the basis of a MAC address(es) of the AP(s) detected by scanning the AP(s) or on the basis of the MAC address(es) and a reception signal level(s) (electric field intensity).

The first position-information estimating unit 570 performs the GPS-based position-information obtaining process to obtain GPS-based position information and calculates its evaluation value. The second position-information estimating unit 580 performs the AP-based position-information obtaining process to obtain AP-based position information and calculates its evaluation value.

The first position-information estimating unit 570 and the GPS module 571 shown in FIG. 9 correspond to a structure including all of the first position estimating unit 311, the GPS decoder 312, the GPS driver 313, and the GPS module 314 shown in FIG. 3. The second position-information estimating unit 580 and the WLAN module 581 shown in FIG. 9 correspond to a structure including all of the second position estimating unit 321, the WLAN driver 322, the WLAN module 323, and the second-position-estimation-unit basic processor 324 shown in FIG. 3. The position-information database 585 shown in FIG. 9 corresponds to the database 325 shown in FIG. 3.

A process performed by the applications 301 and the position-information obtaining unit 302 shown in FIG. 3 is executed as a process performed by a control unit 530 shown in FIG. 9. As shown in FIG. 9, the control unit 530 includes a position-information obtaining unit (location engine) 531 and an application executing unit 532. The control unit 530 performs the process to serve as the position-information obtaining unit (location engine), as has been described above with reference to FIG. 3 and the like, and processes of applications.

More specifically, the position-information obtaining unit (location engine) 531 of the control unit 530 receives, from two different position estimating units, namely, the first position-information estimating unit (GPS-based) 570 and the second position-information estimating unit (AP-based) 580, items of position information (latitude and longitude information) individually obtained using respective techniques and evaluation values thereof. The position-information obtaining unit (location engine) 531 compares the two evaluation values, determines that position information whose evaluation value is higher than the other is more accurate position information, and selects the more accurate position information.

The selected position information is supplied to the application executing unit 532 of the control unit 530. The application executing unit 532 uses the position information in performing processes of applications. That is, for example, the application executing unit 532 performs a process of recording position information that is generated in association with a captured image as attribute information in a file (Exif) of the captured image or a process of displaying a map displayed on a display unit 545 via a display controller 546 as a map of the position corresponding to the obtained position information.

The control unit 530 also controls other processes performed by the imaging apparatus, such as an image capturing process, an image recording process, and an image reproducing process. Programs of the processes performed by the control unit 530 are stored in a read-only memory (ROM) 541 or in another recording unit. Further, the imaging apparatus includes a random access memory (RAM) 542 used as, for example, a work area for the programs or a storage area of parameters; an operation input unit 543 including a shutter and various operation units; an operation input I/F 544; the display unit 545 for displaying images represented by captured image data, maps, and the like; the display controller 546; a memory card 547 used as a storage unit for storing various items of data, programs, and the like; and a memory I/F 548.

Figure 10:
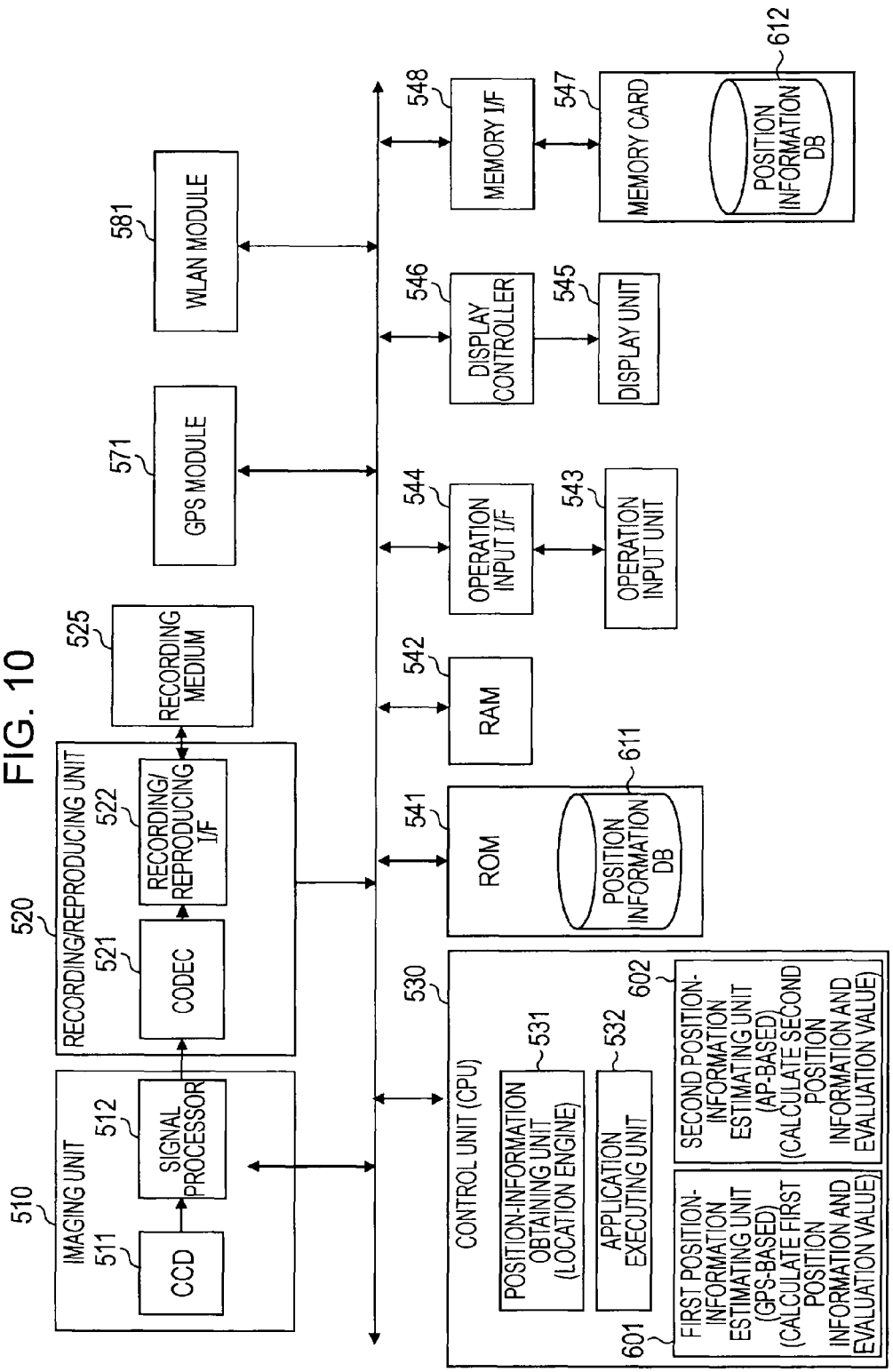
FIG. 10 is a block diagram of an exemplary structure of the imaging apparatus according to the embodiment of the present invention.

The process performed by the first position-information estimating unit 570 and the second position-information estimating unit 580 shown in FIG. 9 may be performed by the control unit (CPU) 530, as shown in FIG. 10. That is, the control unit 530 includes a first position-information estimating unit 601 and a second position-information estimating unit 602 shown in FIG. 10. Further, the database used by the second position-information estimating unit 602 may be formed of, for example, position-information databases 611 and 612 shown in FIG. 10. That is, the database may be set in the ROM 541 and the memory card 547.

In the foregoing embodiment, the case in which the first position estimating unit performs position estimation by receiving radio waves from satellite using the GPS module, and the second position estimating unit performs a position estimation process based on detection information obtained by scanning APs using the WLAN module has been described above. However, the described case is only an example, and the imaging apparatus 100 is not limited to this combination of GPS and WLAN. Alternatively, the imaging apparatus 100 may employ a combination of other position estimation techniques.

For example, the imaging apparatus 100 may employ a position detection process based on communication with base stations of cellular phones and personal handy phones. Further, it is preferable that the imaging apparatus 100 be implemented according to various wireless LAN standards. For example, the IEEE 802.16 standards specify the use of a frequency band from 10 GHz to 66 GHz. In contrast, Worldwide Interoperability for Microwave Access (WIMAX) defined by IEEE 802.16a specifies the use of a frequency band from 2 GHz to 11 GHz. According to these frequency bands used, for example, the manner of evaluating position information of detected APs may be changed. In this manner, it is preferable that changes be made according to the types of communication performed.

The present invention has been described in detail with reference to the specific embodiments. However, it should be understood by those skilled in the art that various modifications, combinations, sub-combinations, and alterations may occur depending on design requirements and other factors insofar as they are within the scope of the appended claims or the equivalents thereof. The scope of the present invention should be determined on the basis of the claims.

The series of processes described herein can be executed by hardware, by software, or by a combination of hardware and software. When the series of processes is executed by software, a program defining the processing sequences is executed by installing it on a memory of a computer embedded in dedicated hardware or on a general-purpose computer that is capable of executing various processes. For example, the program may be recorded in advance on a recording medium. Besides installing the program from the recording medium onto a computer, the program may be received via a network such as a LAN or the Internet and may be installed on a recording medium such as a built-in hard disk.

The processes described in this specification may be executed time sequentially according to the description, or may be executed in parallel or individually depending on the processing performance of an apparatus executing the processes or according to the necessity.

What is claimed is:

1. An imaging apparatus that captures an image, comprising:
    an imaging unit configured to capture an image;
    a recording unit configured to perform a process of recording the captured image on a recording medium;
    a first position estimating unit configured to estimate a position of the imaging apparatus using a first position estimation technique to generate first position information, and to calculate a first evaluation value serving as accuracy evaluation information of the first position information;
    a second position estimating unit configured to estimate the position of the imaging apparatus using a second position estimation technique to generate second position information, the second position estimation technique being different from the first position estimation technique, and to calculate a second evaluation value serving as accuracy evaluation information of the second position information;
    a position-information obtaining unit configured to select, from the first position information and the second position information, position information whose evaluation value is higher than the other; and
    an application executing unit configured to perform data processing using the position information selected by the position-information obtaining unit.

2. The imaging apparatus according to claim 1, wherein the first position estimating unit is configured to generate the first position information by performing a position estimation process using the Global Positioning System; and
    wherein the second position estimating unit is configured to generate the second position information by performing a position estimation process using a technique that is different from the position estimation process using the Global Positioning System.

3. The imaging apparatus according to claim 1, wherein the first position estimating unit is configured to generate the first position information by performing a position estimation process using the Global Positioning System; and
    wherein the second position estimating unit is configured to generate the second position information by searching for a base station of wireless communication, receiving base-station identification information from the detected base station, and searching a database in which base-station identification information is associated with position information.

4. The imaging apparatus according to claim 1, wherein the first position estimating unit is configured to generate the first position information by performing a position estimation process using the Global Positioning System and to calculate the first evaluation value on the basis of measurement status information obtained by analyzing data received from a satellite; and
    wherein the second position estimating unit is configured to generate the second position information by searching for a base station of wireless communication, receiving base-station identification information from the detected base station, and searching a database in which base-station identification information is associated with position information, and to calculate the second evaluation value on the basis of a reception signal level of a reception signal received from the base station at the time the base station is detected, the reception signal level corresponding to an electric field intensity.

5. The imaging apparatus according to claim 4, wherein the first position estimating unit is configured to set a low evaluation value in a case where the measurement status information is two-dimensional and a high evaluation value in a case where the measurement status information is three-dimensional.

6. The imaging apparatus according to claim 4, wherein the second position estimating unit is configured to compare the reception signal level with a predetermined threshold and to set a high evaluation value in a case where the reception signal level is greater than or equal to the threshold and a low evaluation value in a case where the reception signal level is less than the threshold.

7. The imaging apparatus according to claim 1, wherein the application executing unit is configured to perform a process of recording the position information selected by the position-information obtaining unit as position information in a recording file of the captured image.

8. The imaging apparatus according to claim 1, wherein the application executing unit is configured to perform a process of using the position information selected by the position-information obtaining unit as current position information representing a current position on a map displayed on a display unit.

9. An information processing apparatus comprising:
a first position estimating unit configured to estimate a position of the information processing apparatus using a first position estimation technique to generate first position information, and to calculate a first evaluation value serving as accuracy evaluation information of the first position information;
a second position estimating unit configured to estimate the position of the information processing apparatus using a second position estimation technique to generate second position information, the second position estimation technique being different from the first position estimation technique, and to calculate a second evaluation value serving as accuracy evaluation information of the second position information;
a position-information obtaining unit configured to select, from the first position information and the second position information, position information whose evaluation value is higher than the other; and
an application executing unit configured to perform data processing using the position information selected by the position-information obtaining unit.

10. The information processing apparatus according to claim 9, wherein the first position estimating unit is configured to generate the first position information by performing a position estimation process using the Global Positioning System; and
wherein the second position estimating unit is configured to generate the second position information by performing a position estimation process using a technique that is different from the position estimation process using the Global Positioning System.

11. The information processing apparatus according to claim 9, wherein the first position estimating unit is configured to generate the first position information by performing a position estimation process using the Global Positioning System; and
wherein the second position estimating unit is configured to generate the second position information by searching for a base station of wireless communication, receiving base-station identification information from the detected base station, and searching a database in which base-station identification information is associated with position information.

12. The information processing apparatus according to claim 9, wherein the first position estimating unit is configured to generate the first position information by performing a position estimation process using the Global Positioning System and to calculate the first evaluation value on the basis of measurement status information obtained by analyzing data received from a satellite; and
wherein the second position estimating unit is configured to generate the second position information by searching for a base station of wireless communication, receiving base-station identification information from the detected base station, and searching a database in which base-station identification information is associated with position information, and to calculate the second evaluation value on the basis of a reception signal level of a reception signal received from the base station at the time the base station is detected, the reception signal level corresponding to an electric field intensity.

13. An information processing method performed by an information processing apparatus, comprising the steps of:
with a first position estimating unit, estimating a position of the information processing apparatus using a first position estimation technique to generate first position information, and calculating a first evaluation value serving as accuracy evaluation information of the first position information;
with a second position estimating unit, estimating the position of the information processing apparatus using a second position estimation technique to generate second position information, the second position estimation technique being different from the first position estimation technique, and calculating a second evaluation value serving as accuracy evaluation information of the second position information;
with a position-information obtaining unit, selecting, from the first position information and the second position information, position information whose evaluation value is higher than the other; and
with an application executing unit, performing data processing using the selected position information.

14. The information processing method according to claim 13, wherein the first position information is generated by performing a position estimation process using the Global Positioning System; and
wherein the second position information is generated by performing a position estimation process using a technique that is different from the position estimation process using the Global Positioning System.

15. The information processing method according to claim 13, wherein the first position information is generated by performing a position estimation process using the Global Positioning System; and
wherein the second position information is generated by searching for a base station of wireless communication, receiving base-station identification information from the detected base station, and searching a database in which base-station identification information is associated with position information.

16. The information processing method according to claim 13, wherein the first position information is generated by performing a position estimation process using the Global Positioning System, and the first evaluation value is calculated on the basis of measurement status information obtained by analyzing data received from a satellite; and
wherein the second position information is generated by searching for a base station of wireless communication, receiving base-station identification information from the detected base station, and searching a database in which base-station identification information is associated with position information, and the second evaluation value is calculated on the basis of a reception signal level of a reception signal received from the base station at the time the base station is detected, the reception signal level corresponding to an electric field intensity.

17. The information processing method according to claim 16, wherein, when the first evaluation value is calculated, a low evaluation value is set in a case where the measurement status information is two-dimensional and a high evaluation value is set in a case where the measurement status information is three-dimensional.

18. The information processing method according to claim 16, wherein, when the second evaluation value is calculated, the reception signal level is compared with a predetermined threshold, and a high evaluation value is set in a case where the reception signal level is greater than or equal to the threshold and a low evaluation value is set in a case where the reception signal level is less than the threshold.

19. The information processing method according to claim 13, wherein, when the data processing is performed using the selected position information, a process of recording the selected position information as position information in a recording file of the captured image is performed.

20. The information processing method according to claim 13, wherein, when the data processing is performed using the selected position information, a process of using the selected position information as current position information representing a current position on a map displayed on a display unit is performed.

* * * * *